United States Patent [19]
McIntyre et al.

[11] Patent Number: 5,291,188
[45] Date of Patent: Mar. 1, 1994

[54] METHOD AND APPARATUS FOR ALLOCATING OFF-SCREEN DISPLAY MEMORY

[75] Inventors: Bruce McIntyre, Cupertino; Curtis Priem, Fremont; Robert Rocchetti, Cupertino, all of Calif.

[73] Assignee: Sun Microsystems, Inc., Mountain View, Calif.

[21] Appl. No.: 716,671

[22] Filed: Jun. 17, 1991

[51] Int. Cl.$^5$ ............................................... G09G 1/16
[52] U.S. Cl. .................................... 345/189; 345/200; 345/203
[58] Field of Search ................. 340/799, 798, 747; 395/164, 165, 166

[56] References Cited

U.S. PATENT DOCUMENTS

| | | | |
|---|---|---|---|
| 4,642,790 | 6/1992 | Minshull et al. | 340/726 |
| 4,692,880 | 9/1987 | Merz et al. | 395/164 |
| 4,742,474 | 5/1988 | Knierim | 395/165 |
| 4,845,640 | 7/1989 | Ballard et al. | 395/165 |
| 4,882,683 | 11/1989 | Rupp et al. | 340/799 |
| 4,920,504 | 4/1990 | Sawada et al. | 395/166 |
| 4,980,765 | 12/1990 | Kudo et al. | 340/799 |
| 5,062,057 | 10/1991 | Blucken et al. | 340/799 |
| 5,095,446 | 3/1992 | Jingu | 395/165 |
| 5,113,180 | 5/1992 | Gupta et al. | 340/747 |

Primary Examiner—Richard Hjerpe
Assistant Examiner—S. Saras
Attorney, Agent, or Firm—Blakely Sokoloff Taylor & Zafman

[57] ABSTRACT

A method of allocating space in a frame buffer memory which is not used for storing pixels to be displayed currently including the steps of selecting a portion of the memory to be allocated for off-screen memory; determining the size of an area to be allocated; comparing the size of the area to be allocated with portions of the memory available to be allocated for off-screen memory using a memory allocation technique in which the least area considered is at least as great in either its horizontal or its vertical dimension as the greater dimension of the area to be allocated, the comparison being conducted in a pattern which consistently checks first a minimum area followed by three other minimum areas in an area having a size which is the next power of two larger in each dimension than the minimum area, then four more minimum areas in an adjacent area having a size which is the next power of two larger in each dimension than the minimum area than the minimum area in the pattern, the area selected for the second adjacent area being selected in the same pattern as are the minimum areas; continuing the pattern through areas which increase on the basis of the next power of two larger in each dimension of the last largest area, the search using the pattern used for selection in the minimum areas; and allocating the first area found of sufficient space to provide the memory area sought.

8 Claims, 3 Drawing Sheets

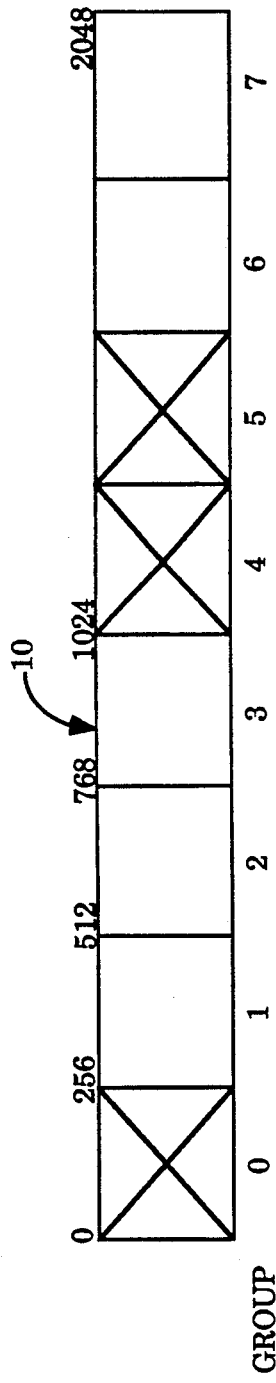
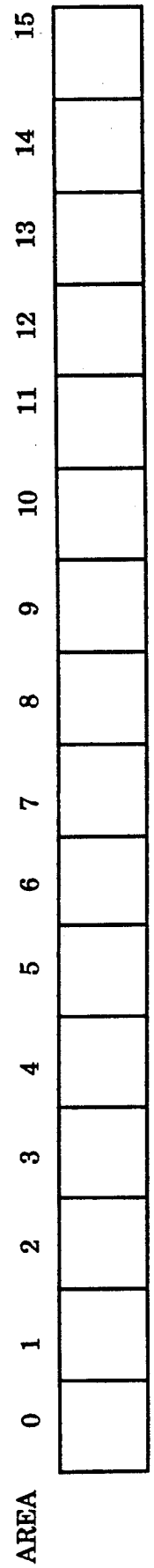
*Figure 1*
*Figure 2*
*Figure 4*

METHOD AND APPARATUS FOR ALLOCATING OFF-SCREEN DISPLAY MEMORY

BACKGROUND OF THE INVENTION

1. Field Of The Invention

This invention relates to memory allocation methods and, more particularly, to methods for allocating display memory which is not storing visible pixel data.

2. History Of The Prior Art

A typical computer system generates data which is displayed on an output display. This output display is most often a cathode ray tube which displays a number of full screen images one after another so rapidly that to the eye of the viewer the screen appears to display constant motion when a program being displayed produces such motion.

In order to produce the individual images (frames) which are displayed one after another, data is written into a frame buffer. The frame buffer stores information about each position on the display which can be illuminated (each picture element or pixel) to produce the full screen image. For example, a particular display may be capable of displaying pixels in approximately one thousand horizontal rows each having approximately one thousand pixels. All of this information is stored in the frame buffer where it can be repeatedly scanned to the display.

Typically, data is transferred from the frame buffer to the display pixel by pixel and line by line beginning at the upper left hand corner of the display and proceeding horizontally from left to right, line by line, downwardly to the lower right hand corner of the display. This process is called raster scanning. In order for the picture to appear continuous on the output display, the successive frames in the frame buffer are constantly scanned to the output display at a rate of sixty frames per second or more.

While each frame of data is being scanned to the display, any new data to appear in the next frame must be transferred to the frame buffer. New data to be displayed in a frame may be written to the portion of the frame buffer being changed at any time. In order to allow information to be both written to the frame buffer and scanned from the frame buffer to the output display simultaneously, two ported video random access memory (VRAM) is typically used for the frame buffer. Data is written to the frame buffer through one port and scanned to the display through the other.

If data is being placed in a frame buffer at the same time that information is being scanned to the display, it is possible that information being scanned to the display will come from two time displaced frames. For example, if scanning is proceeding at a faster rate than data is being written to the frame buffer and a portion of the frame buffer which is changing (being written) is scanned to the display, a portion of the display will be from what should be a first frame and a portion from what should be a succeeding frame. The display of portions of two time displaced frames simultaneously can be disconcerting where the display is rapidly changing as in real time video. It may produce images which are grossly distorted and are referred to as frame tears.

In order to eliminate frame tears, double buffered display memory may be used. Double buffering uses two complete frame buffers each of which may store one entire frame. Data is written to one frame buffer and scanned to the display from the other frame buffer. Since data is never written to a frame buffer from which data is being scanned to the display, frame tears cannot occur. Double buffering is typically used with programs which present rapidly changing data on the output display.

Not all programs need to utilize the facilities offered by double buffered display systems. Typical examples are programs which produce primarily text or limited two dimensional graphics output. When such programs are running on a computer having the facilities to accomplish double buffering and double buffering is inactive, a significant amount of especially expensive frame buffer memory is unused. Because this memory is closely associated with the output display, it is in an excellent position to be used for off-screen storage of information related to the display. For example, this memory may be used to store currently invisible information from windows which have portions that are presently covered by other windows being displayed. This memory is especially useful where a graphics accelerator is used with the display to eliminate the delays which are incurred when the usually slower central processor must update the display because it allows the graphics accelerator to manipulate data which would otherwise have to be stored in system memory and manipulated by the central processor. This is especially important where the frame buffer offers an especially large amount of excess memory such as is the case with unused double buffering space. In a particular arrangement, almost three megabytes of frame buffer memory are available for off-screen use; this offers a substantial amount of memory for information that need not be transferred back to system memory with the delay inherent to such transfers.

Of course, the excess display memory is only useful if it may be used with sufficient efficiency that the rendering of information on the display by the graphics accelerator and other system maintenance operations are not delayed. One of the necessary steps in the utilization of any memory is to allocate the different portions of that memory to the various uses to which it may be put. Because of the very great amount and rapidly changing nature of information which must be provided to operate an advanced color output display in a multitasking environment, if the allocation process is slow, then the operation of displaying information on the output display may be slowed. In an extreme case, the operation of the entire computer system may be slowed waiting for memory allocation. Prior art processes have not been fast enough to allow extra memory available in a frame buffer to be used to store off-screen data in such an environment.

SUMMARY OF THE INVENTION

It is, therefore, an object of the present invention to provide a method for efficiently allocating display memory space for storage of off-screen information.

It is another more specific object of the present invention to provide a very efficient method of allocating display memory space for storage of off-screen information.

These and other objects of the present invention are realized by a method of allocating space in a frame buffer memory which is not used for storing pixels to be displayed currently including the steps of selecting a portion of the memory to be allocated for off-screen memory; determining an area to be allocated; comparing the area to be allocated with portions of the memory available to be allocated for off-screen memory using a memory allocation technique in which the minimum area considered is at least as great in either its horizontal or its vertical dimension as the greater dimension of the area to be allocated, the comparison being conducted in a pattern which consistently checks first a minimum area followed by three other minimum areas in an area having a size which is the next power of two larger in each dimension than the minimum area, then four more minimum areas in an adjacent area having a size which is the next power of two larger in each dimension than the minimum area in the pattern, the area selected for the second adjacent area being selected in the same pattern as are the minimum areas; continuing the pattern through areas which increase on the basis of the next power of two larger in each dimension of the last sized pattern, the search using the pattern used for selection in the minimum areas; and allocating the first area found of sufficient space to provide the memory area sought.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is an illustration of a single contiguous array of linear memory positions useful in understanding prior art memory allocation systems.

FIG. 2 is a bit map used in a typical prior art memory allocation system.

FIG. 4 is a bit map used in a memory allocation system in accordance with the present invention.

NOTATION AND NOMENCLATURE

Figure 3:
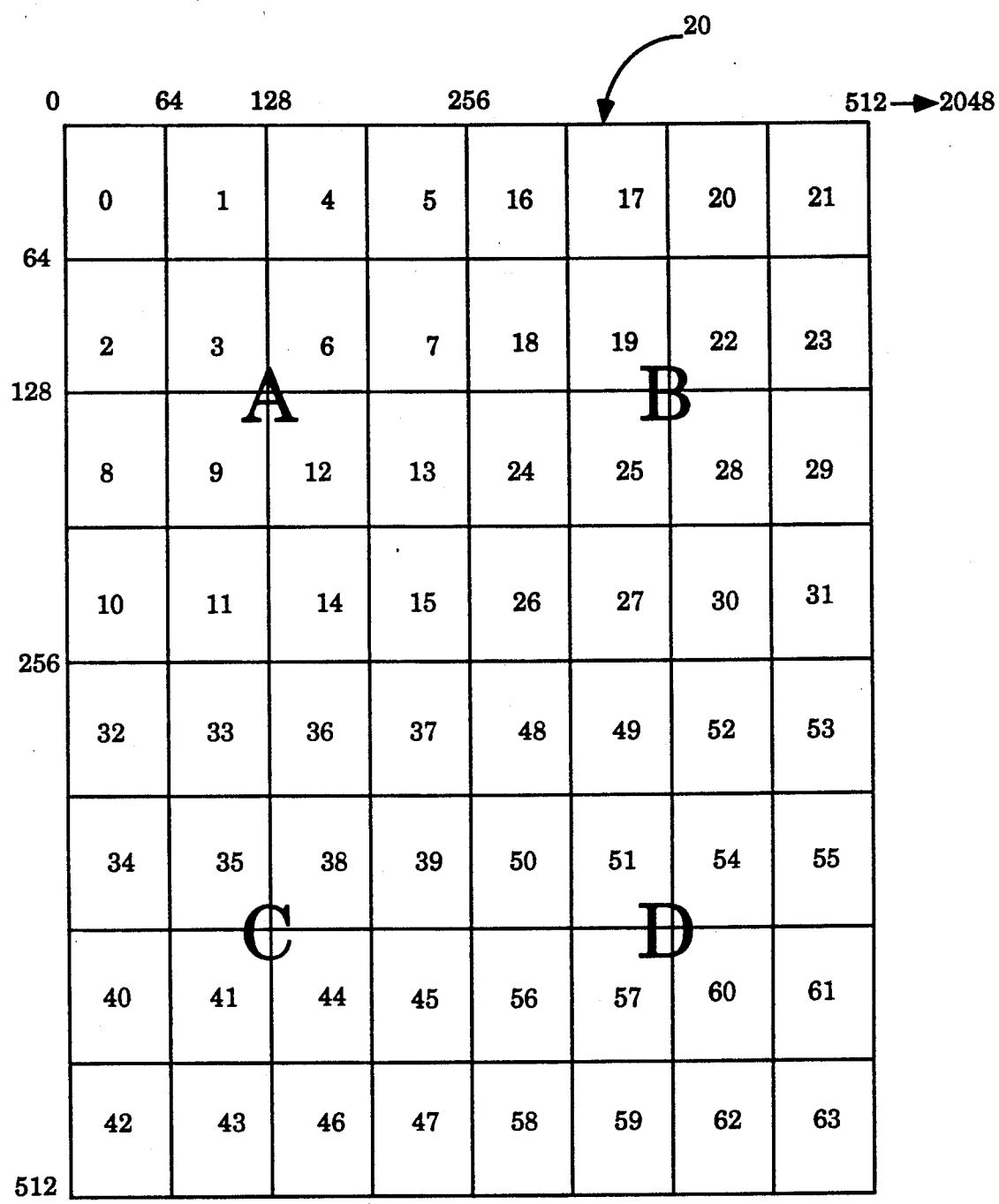
FIG. 3 is an illustration of a portion of a frame buffer memory useful in understanding the method of allocation of memory used in the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

DETAILED DESCRIPTION OF THE INVENTION

Referring now to FIG. 1, there is illustrated a short section of what may be described as typical contiguous linear memory 10 utilized for random access memory in a computer system. The memory 10 illustrated includes a sufficient number of individual storage positions to store a total of 2048 bytes (two kilobytes) of data. If this linear memory 10 is used to store pixel data and each pixel is assumed for exemplary purposes to be described by eight individual bits, then the memory 10 includes storage space for 2048 individual pixels. Normally, the amount of memory illustrated would be considered to be sufficient to store the data describing one or two horizontal rows of pixels to be presented on an output display. Additional amounts of linear memory are necessary to store the data for each of the additional rows to be displayed (e.g., 2048 rows of storage positions if the display has 2048 by 2048 pixels).

Such a large number of pixel positions allows the frame buffer made up of this memory to be utilized with display monitors which display up to two kilobytes of pixels on each horizontal row of the display. Of course, not all (in fact, few) monitors are capable of displaying such a large number of pixels on an individual row. Such a frame buffer may be used with monitors displaying a fewer number of pixels by allocating less of the frame buffer to the output display. This, of course, leaves a large amount of frame buffer memory unused. An even greater amount of memory is potentially unused if enough frame buffer memory exists to separately display two full frames of data as may be necessary when double buffering and no application programs being run by the computer system are making use of double buffering.

When only data to be displayed is stored in a frame buffer, the method by which portions of the frame buffer are allocated is not important to the speed of operation of the system. In such a case, some area is apportioned for the particular monitor being used; and the starting and ending addresses for the area allocated are stored in some memory location in system memory. Generally, the single area allocated is quite large and does not change during the operation of a program. Consequently, the speed with which it is allocated is unimportant. However, if portions of the excess memory space are to be utilized for other purposes, it is necessary that a method for allocating smaller portions of memory rapidly be devised so that changing information may be mapped to this excess space.

In addition, if it is desirable to use associated graphics rendering hardware to manipulate the pixels in this off-screen memory, the memory allocation technique must take into account any memory access size stride (number of pixels from one scanline to the next). In effect, the off-screen memory must be treated as having the same two dimensional addressing architecture as the visible portion of the frame buffer. Thus, a more sophisticated mechanism that just allocating contiguous linear blocks of memory must be used.

For example, one of the primary aims of computer designers is to allow a number of individual programs to run on a computer and to be displayed simultaneously on an output display of that computer. Typically, when a number of individual programs are displayed on a computer output display, each individual program appears in a window, usually a rectangular area of the screen which may be moved about, enlarged and reduced in size, and otherwise manipulated. If a number of programs can be run and displayed in a number of windows simultaneously, then operations taking place in one program may be easily related to operations in another, data may be easily transferred between the programs, and, in general, the work being accomplished using the computer may be accelerated. This is because when the computer is performing multiple tasks simultaneously, it can be idle less of the time from the need to wait for resources for any particular task.

Often, a window displaying one application program will overlap and obscure a window displaying another application program. It is desirable that the covered data be stored so that it may be redisplayed without having to refer to system memory if the covering window is moved or disappears. It may also be necessary to keep this invisible portion of the window up to date with the contents of the visible portion of the window which may be actively changing. If the covered portions of application programs being displayed in windows on the output display are to be stored in the excess frame buffer memory, there must be a way to allocate memory space sufficient for various sized windows and to deallocate that space when it is no longer used. Moreover this allocation must be able to function very rapidly in order to keep the display operating at its normal rate without any distortion caused by allocation delays.

A typical high performance method by which an area of contiguous linear memory is allocated in a computer begins with some convenient amount of memory, divides that area of storage in half, each half in half, each quarter in half, and so on until, for example, the row shown as memory 10 is divided into a number of minimum size groups of storage positions each containing a number of bytes. For example, the memory 10 having 2048 bytes might be divided into groups of contiguous bytes each of which contain 256 bytes. These individual groups could then be allocated to individual storage purposes.

In order to record the allocation of the storage groups for a large area of memory, the memory is broken into many minimal sized contiguous groups of sizes which are powers of two. A bit map of linear memory is then created in which each bit included maps to one of these minimal sized groups. A bit might be a one if the group is allocated and a zero if the group is not allocated. When memory 10 is allocated, it is allocated in an amount equal to the minimum amount, to an amount twice that amount, to an amount four times that amount, or to a greater amount in the same power of two size progression until a large enough block is found to satisfy the requested size.

For example, if an amount of memory sufficient to store 512 bytes were to be desired, the allocation system would look in the bit map (see FIG. 2) for a pair of adjacent empty bits each representing groups of 256 bytes. The search might begin at the first position 0 at the left end of the memory 10 and continue to the right. Typically, if two adjacent groups were needed, the program would search in the bit map by increments of two bits and would not look at any amount of memory space not divided on a two bit binary division boundary line. Thus, if group 0 on the line of memory positions illustrated in FIG. 1 were allocated, the search would skip over group 1 (even though empty) to check groups 2 and 3 as a pair. If groups 2 and 3 are found to be empty, these positions would be allocated and each marked with a one in the bit map. If it were desired to allocate a larger amount of memory, then the system would check on binary division lines divisible by that larger amount. It will be recognized that this scheme of allocation leaves large amounts of unused memory but has the advantage of proceeding very rapidly to find available memory.

Such a system is very useful where the memory to be allocated proceeds in a contiguous linear manner. However, with display memory such as that used in a frame buffer, the real need is to allocate a two dimensional area of memory in which data describing a window may be stored. Because of the two dimensional architecture of this memory, allocation is not done in a contiguous linear manner but in a manner which is two dimensional in nature and may thus be discontiguous. In order to do this with the prior art system, each horizontal row of the memory would have to be individually allocated. This is extremely time consuming and reduces the speed of the allocation to a point that the actual display of data would be slowed. This makes the allocation of the extra unused space an impossibility in systems handling rapidly changing data.

FIG. 3 shows a small portion of a frame buffer 20 to illustrate an allocation method in accordance with the present invention. Using this method, space in frame buffer memory may be allocated on a two dimensional basis. In FIG. 3, the memory 20 is divided into portions with pixel area dimensions based on powers of two; but rather than being divided only in contiguous linear groups, it is divided in these portions in both the horizontal and the vertical directions. The amount of memory is again allocated in a minimum amount; in the preferred embodiment that minimum is 64 bytes in each of the horizontal and vertical directions. If each pixel requires one byte of storage, this provides a total of storage space capable of storing 4096 pixels in each minimum area.

The allocation of each minimum area is again recorded by a single bit, a one if the area is allocated and a zero if the area is not allocated. The bit map (FIG. 4) recording this information is again stored linearly. However, the areas are patterned and numbered in the manner illustrated in FIG. 3 so that positions 0–3 form a next larger area which may be allocated which has twice the dimension of the minimum area in each of the horizontal and vertical directions. This allows a search for a minimum area to begin at position 0 and continue in number order until a minimum area is found which has not been allocated. If a larger area than the minimum is sought, for example, an amount greater than one minimum area but less than four minimum areas, the search proceeds on boundaries of four minimum areas. This may be easily accomplished by simply incrementing the address by four bit positions in the bit map.

Similarly, if an area larger than four minimum areas but less than sixteen minimum areas is sought, the search of the bit map may proceed on address boundaries which review addresses beginning only at every sixteen bit positions in the bit map. Sixteen bits is the size of a short integer in a preferred system so incrementing on this basis is very rapidly done. In this manner, the search may be accomplished very rapidly.

In contrast to the typical search conducted by the prior art for allocation purposes, any allocation using the method of the present invention provides an area of bit positions by extending in both the horizontal and vertical directions so that time consuming row by row allocation is not necessary. This allows the method to be used to allocate space in a frame buffer used with a graphics accelerator without delaying the operation of rendering to the display.

Figure 5:
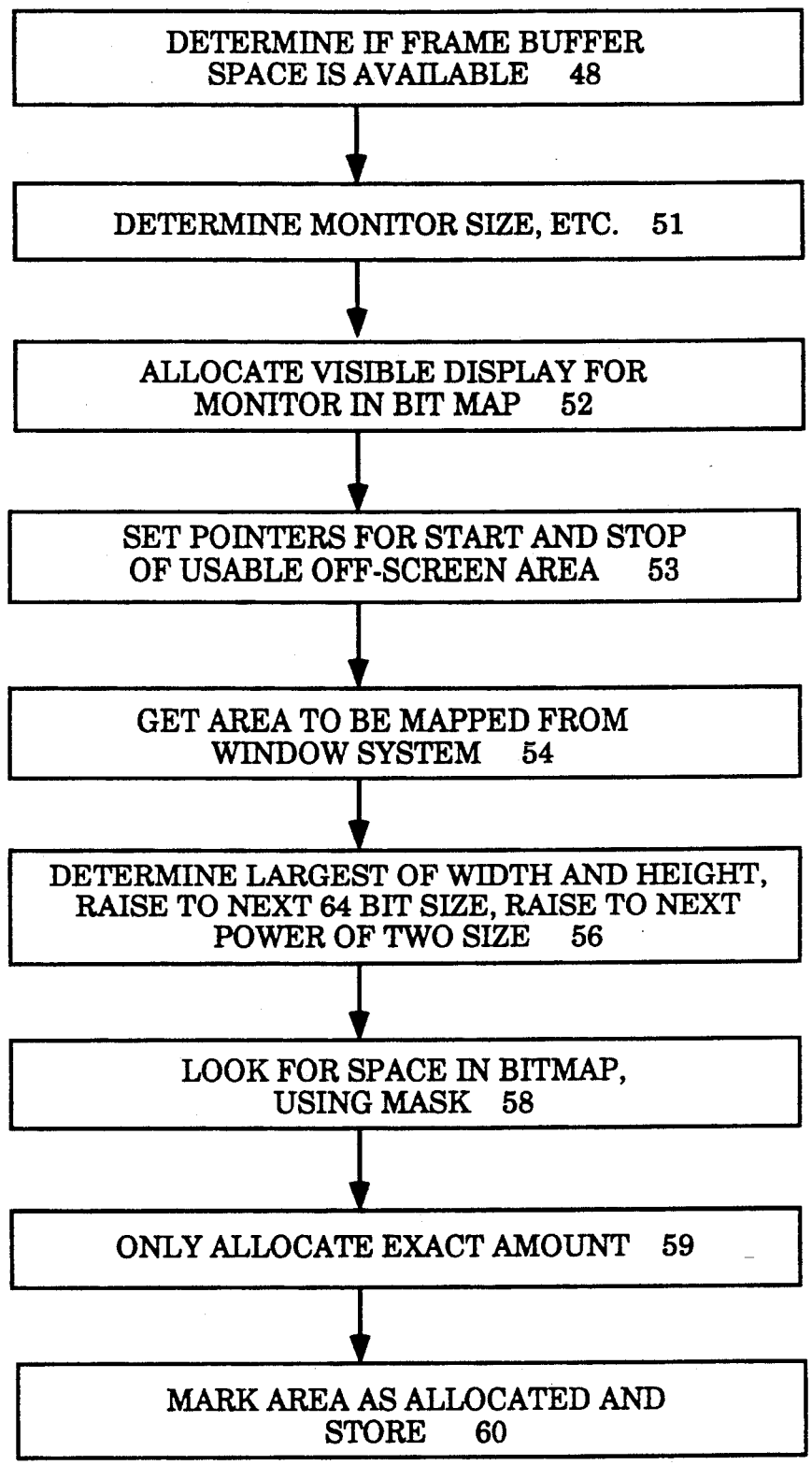
FIG. 5 is a block diagram illustrating a method of allocating frame buffer memory in accordance with the invention.

FIG. 5 illustrates the steps of the method which has been generally described above for allocating display memory in a frame buffer for both display and off-screen purposes. As is illustrated in FIG. 5, at step 48, when the computer system first turns on, a low level driver program which is a portion of the operating system reads various values (usually produced by an EPROM in the frame buffer hardware) which signifies that the frame buffer has memory space which can be used as off-screen memory. Then a value which may be stored in system memory describing the size of the display monitor is determined at step 51 and utilized to ascertain the amount of display memory to be allocated to the display itself. Typically, the allocation at step 52 begins at a first addressable position in the memory and continues until sufficient memory has been allocated for display purposes.

The last address allocated for the pixels to be displayed is typically used to determine a first position from which the allocation process in accordance with the invention may proceed. This first address may be stored as the zero address for the allocation scheme illustrated and used as a pointer (step 53) for the beginning of the useable off-screen area of the frame buffer. Since a region of the frame buffer for the display memory is allocated by the method, the size of that area may be changed when an application able to utilize double buffering is encountered. Thus, the size of off-screen memory may grow or shrink with the program operating.

The operation then moves to step 54 to obtain the size of the area which is to be used as off-screen memory for a particular purpose. For example, if a window is to be backed up in off-screen memory so that it may be reproduced when uncovered, the size of this window is obtained from the window system program. With this size, the operation proceeds to step 56 where the area to be allocated is determined.

The area to be allocated is determined by taking each of the width and height values and comparing those values to the width and height of the minimum areas. If a width in the preferred embodiment is between a single pixel and sixty-four pixels, then a width of sixty-four pixels is selected. If a width is between sixty-four and one hundred twenty-eight pixels, then one hundred twenty-eight pixels is selected for a width. If a width is between one hundred twenty-eight pixels and two hundred fifty-six pixels, then two hundred fifty-six pixels is selected for a width and so on so that the next power of two size value is chosen. In a similar manner, if a height is between one and sixty-four pixels, then sixty-four pixels is selected. With the width and height of the least area in which the desired space fits chosen, the smaller of these dimensions is boosted to the same value as the larger in the basic search process. This allows allocation of areas which divided along square power-of-two-sized boundaries. With the minimum space determined, a mask for the actual window shape within this space is generated and the search commences (as illustrated at step 58) in the bit map for an area sufficient to contain the area sought.

This search is conducted on power of two boundaries equivalent to the size of the area sought. Thus, if a minimum area is sought, the search increments bit by bit sequentially through the bit map. If the area sought is a block such as the block containing the minimum areas 0–3 in FIG. 3, the search steps through the bit map in larger increments looking for a sufficient storage area. As may be seen in FIG. 3, the search for a block containing four minimum sized areas starts at the upper left of the frame buffer, moves one four area block to the right, then moves to the left and down one four area block, and finally to the right for the next four area block. If space has not yet been found, the search moves to the right by another four area block and up one four area block. At this point, the pattern of the first search is repeated for the area marked "b" in the figure. If an area for allocation is not found in the area "b", the search moves to the area "c" and finally to the area "d". If the search has not been fruitful to that point, the search moves to an area immediately to the right of the area "a, b, c, d" just described and repeats the pattern of search. This same pattern continues over a continually broadening areas is illustrated by the capitol letters "ABCD" in FIG. 3. This search technique is similar to a search technique called a "quad tree search" used in some two dimensional graphics algorithms.

Once an area has been found with sufficient storage space to match the space sought, the area is allocated at step 59. Finally, the area allocated is marked in the bit map as allocated so that it will not be used for any other purpose.

In a preferred embodiment, if either the width or the height of the area desired is less than one-half of the other minimum dimension, an additional test is made within allocation search areas which already have one or more minimum areas allocated in order to improve the density of allocation in those areas which contain unallocated memory space and conserve space in the frame buffer memory. This test compares the size of the lesser dimension of the area sought with one-half of a dimension of the minimum area being searched. If the size of the lesser dimension of the area sought is equal to or less than one-half of a dimension of the minimum area being searched, then each half of each minimum size area searched is tested to see if it is free and may be allocated.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer system comprising a frame buffer memory, a method for allocating space in a selected portion of a frame buffer memory to store off-screen information, said method comprising the steps of:

dividing said selected portion of frame buffer memory into a matrix of blocks, each block having equal width and equal height, said block width and block height being equal to a power of two;

adjusting a requested memory size comprising a requested width and a requested height, rounding said requested width and requested height to the next power of two larger than the larger of said requested width and height;

searching said selected portion of said frame buffer memory for a free area to allocate, said free area being equal to said adjusted requested size comprising an integral multiple of said frame buffer memory blocks, said search being systematically conducted in an initial corner area and a series of three adjacent area sets until said free area is found, said initial corner area and each of the three adjacent areas of the first three adjacent area set being equal in size to said free area being sought, each of the three adjacent areas of the $n^{th}$ three adjacent area set being four times in size of each of the three adjacent areas of the $n-1^{th}$ three adjacent area set and two of the three adjacent areas of the $n^{th}$ three adjacent area set being adjacent to two of the three adjacent areas of the $n-1^{th}$ three adjacent area set, each of the three adjacent areas of the $n^{th}$ three adjacent area set being searched in the same manner as said initial corner area and $n-1$ three adjacent area sets were searched;

allocating said memory blocks within said free area found by said search.

2. The method of allocating space as set forth in claim 1, wherein said search comprises searching a bit map in which each of said frame buffer memory blocks is represented by a single bit of data.

3. The method of allocating space as set forth in claim 2, wherein said bitmap search comprises searching successive groups of bits of said bitmap corresponding to said initial corner area and subsequent adjacent areas.

4. The method of allocating space as set forth in claim 3, wherein if a selected one of said requested width and said requested height is less than one-half of one dimension of said free area being sought, then an additional test is made in each of said searches to determine if half of each of said areas being searched is free to be allocated.

5. In a computer system comprising a frame buffer memory, an apparatus for allocating space in a selected portion of a frame buffer memory to store off-screen information, said apparatus comprising:

division means coupled to said frame buffer memory for dividing said selected portion of frame buffer memory into a matrix of blocks, each block having equal width and equal height, said block width and block height being equal to a power of two;

adjustment means for adjusting a requested memory size comprising a requested width and a requested height, rounding said requested width and requested height to the next power of two larger than the larger of said requested width and height;

search means coupled to said adjustment means and said frame buffer memory for searching said selected portion of said frame buffer memory for a free area to allocate, said free area being equal to said adjusted requested size comprising an integral multiple of said frame buffer memory blocks, said search being systematically conducted in an initial corner area and a series of three adjacent area sets until said free area is found, said initial corner area and each of the three adjacent areas of the first three adjacent area set being equal in size to said free area being sought, each of the three adjacent areas of the $n^{th}$ three adjacent area set being four times in size of each of the three adjacent areas of the $n-1^{th}$ three adjacent area set and two of the three adjacent areas of the $n^{th}$ three adjacent area set being adjacent to two of the three adjacent areas of the $n-1^{th}$ three adjacent area set, each of the three adjacent areas of the $n^{th}$ three adjacent area set being searched in the same manner as said initial corner area and $n-1$ three adjacent area sets were searched;

allocation means coupled to said search means for allocating said memory blocks within said free area found by said search.

6. The apparatus as set forth in claim 5, wherein said search means performs said searches by searching a bit map in which each of said frame buffer memory blocks is represented by a single bit of data.

7. The apparatus as set forth in claim 6, wherein said search means performs said bitmap search by searching successive groups of bits of said bitmap corresponding to said initial corner area and subsequent adjacent areas.

8. The apparatus as set forth in claim 7, wherein said search means further tests if a selected one of said requested width and said requested height is less than one-half of one dimension of said free area being sought, if so then said search means conducts an additional test in each of said searches to determine if half of each of said areas being searched is free to be allocated.

* * * * *